(12) United States Patent
Gruson

(10) Patent No.: US 8,741,102 B2
(45) Date of Patent: Jun. 3, 2014

(54) DEVICE FOR EVAPORATING A TREATMENT LIQUID

(75) Inventor: Bertrand Gruson, Breville sur Mer (FR)

(73) Assignee: Serac Group, La Ferte Bernard (FR)

( * ) Notice: Subject to any disclaimer, the term of this patent is extended or adjusted under 35 U.S.C. 154(b) by 470 days.

(21) Appl. No.: 13/030,927

(22) Filed: Feb. 18, 2011

(65) Prior Publication Data
US 2011/0203914 A1 Aug. 25, 2011

(30) Foreign Application Priority Data

Feb. 19, 2010 (FR) ...................................... 10 51211

(51) Int. Cl.
*B01D 1/16* (2006.01)
*B01J 7/00* (2006.01)

(52) U.S. Cl.
USPC ........... 159/4.08; 159/4.01; 202/262; 203/90; 34/585; 34/594; 34/58; 422/299; 422/305

(58) Field of Classification Search
USPC ........ 202/241, 262, 270; 203/90; 159/3, 4.01, 159/4.08; 34/576, 577, 585, 594, 58, 85; 134/109, 172, 198; 422/298, 299, 305
See application file for complete search history.

(56) References Cited

U.S. PATENT DOCUMENTS

| | | | | |
|---|---|---|---|---|
| 2,289,191 A * | 7/1942 | Hall | ............................. | 159/48.1 |
| 2,326,142 A * | 8/1943 | Hall | ............................. | 159/17.3 |
| 2,400,459 A * | 5/1946 | Hall | ............................. | 159/4.09 |
| 2,859,155 A * | 11/1958 | Cichelli et al. | .................. | 203/90 |
| 3,735,792 A * | 5/1973 | Asizawa et al. | ............... | 159/4.04 |
| 4,296,068 A | 10/1981 | Hoshino | | |
| 4,512,935 A * | 4/1985 | Hilmersson et al. | ......... | 261/79.2 |
| 4,631,173 A | 12/1986 | Müller et al. | | |
| 4,742,667 A * | 5/1988 | Muller et al. | .................... | 53/167 |
| 5,772,850 A | 6/1998 | Morris | | |
| 5,997,827 A * | 12/1999 | Mezger et al. | ................ | 422/292 |
| 6,899,856 B2 * | 5/2005 | Itoh et al. | ....................... | 422/305 |
| 7,010,900 B2 * | 3/2006 | Grossmann et al. | ............ | 53/167 |
| 7,121,062 B2 * | 10/2006 | Till | ................................ | 53/167 |

FOREIGN PATENT DOCUMENTS

| | | |
|---|---|---|
| DE | 1729410 A1 | 8/1971 |
| DE | 10145818 C1 | 10/2002 |
| EP | 1142592 A1 | 10/2001 |
| FR | 2083223 A5 | 12/1971 |
| WO | WO91/17804 | 11/1991 |

* cited by examiner

*Primary Examiner* — Nina Bhat
*Assistant Examiner* — Jonathan Miller
(74) *Attorney, Agent, or Firm* — Muncy, Geissler, Olds & Lowe, P.C.

(57) ABSTRACT

The device for evaporating a treatment liquid comprises a cylindrical enclosure having an outlet orifice opening out into the top end of the enclosure, the enclosure being placed vertically and having a heated inside wall, and liquid nozzles associated with a blow pipe for blowing air under pressure so as to form a jet comprising a mixture of air and of pulverized treatment liquid in a direction that is tangential to the inside wall of the enclosure, each liquid nozzle and the associated blow pipe being arranged so that the jet of mixture is formed in an upper portion of the enclosure and is downwardly inclined.

10 Claims, 2 Drawing Sheets

DEVICE FOR EVAPORATING A TREATMENT LIQUID

The present invention relates to a device for evaporating a treatment liquid, and particularly but not exclusively, to a device for extracting hydrogen peroxide from a solution of hydrogen peroxide.

BACKGROUND OF THE INVENTION

Hydrogen peroxide is known for use in particular for sterilizing containers prior to aseptic filling of the containers. Nevertheless, hydrogen peroxide is considered as being a pollutant and precise standards therefore exist concerning the residual quantities thereof that are acceptable when the container is to contain foodstuffs. In order to satisfy those standards, containers must be treated with a treatment gas that is free from any droplets of liquid.

It is known to extract hydrogen peroxide from a hydrogen peroxide solution by causing the solution to evaporate. In particular, it is known from document U.S. Pat. No. 4,631,173 to spray a solution of hydrogen peroxide into a flow of air and then to put the resulting stream into contact with the inside wall of a heated tube. Nevertheless, in order to ensure that all of the solution is in the vapor state, it is necessary to provide a tube of great length, thereby giving rise to an installation that is bulky. In addition, the solution deposits solid residues inside the tube, which residues are inaccessible and therefore difficult to eliminate.

It is also known from document WO 91/17804 to provide an evaporator that has a cylindrical enclosure with a heated wall into which a liquid mixture is introduced in spray form by means of a liquid nozzle arranged to introduce the liquid for spraying with cyclonic movement inside the enclosure. Nevertheless, that evaporator is for distilling a fraction of the mixture and its structure does not make it possible to obtain a transformation of the liquid into a purely gaseous stream.

OBJECT OF THE INVENTION

An object of the invention is to propose a device that is of simple structure and that enables a treatment gas to be extracted from a treatment liquid in a manner that is reliable from the point of view of extracting gas without entraining liquid and from the point of view of the operation of the device.

SUMMARY OF THE INVENTION

In order to achieve this object, the invention provides a device for evaporating a treatment liquid, the device comprising a cylindrical enclosure having an outlet orifice opening out into the top end of the enclosure, the enclosure being placed vertically and having a heated inside wall, and introduction means for introducing the treatment liquid into the enclosure so that it performs cyclonic movement in contact with the inside wall of the enclosure, wherein the introduction means comprise at least one liquid nozzle associated with a blow pipe for blowing air under pressure so as to form a jet comprising a mixture of air and of pulverized treatment liquid in a direction that is tangential to the inside wall of the enclosure, each liquid nozzle and the associated blow pipe being arranged so that the jet of mixture is formed in an upper portion of the enclosure and is downwardly inclined.

Thus, the mixture moves downwards in cyclonic manner to the bottom of the enclosure and then rises, likewise in cyclonic manner, via the center of the enclosure, such that drops of treatment liquid are subjected to centrifugal force that conveys them towards the hot wall for a length of time that is sufficient to ensure that the outlet stream is free from any droplets.

In an advantageous version of the invention, the enclosure includes a collar projecting into the inside of the enclosure between said at least one liquid nozzle and the outlet orifice. This avoids any liquid rising up along the inside wall of the enclosure.

According to another advantageous aspect of the invention, the device includes at least one additional blow pipe, thereby making it possible at will to vary the quantity of treatment gas that is finally contained in the stream flowing through the outlet. An additional blow pipe is preferably associated with each liquid nozzle and is placed relative thereto so as to direct the jet of mixture downwards. This avoids droplets being projected upwards at the outlet from the liquid nozzle.

BRIEF DESCRIPTION OF THE DRAWINGS

Other characteristics and advantages of the invention appear in the light of the following description of a particular, non-limiting embodiment of the device of the invention, given with reference to the accompanying figures, in which.

DETAILED DESCRIPTION OF THE INVENTION

Figure 1:
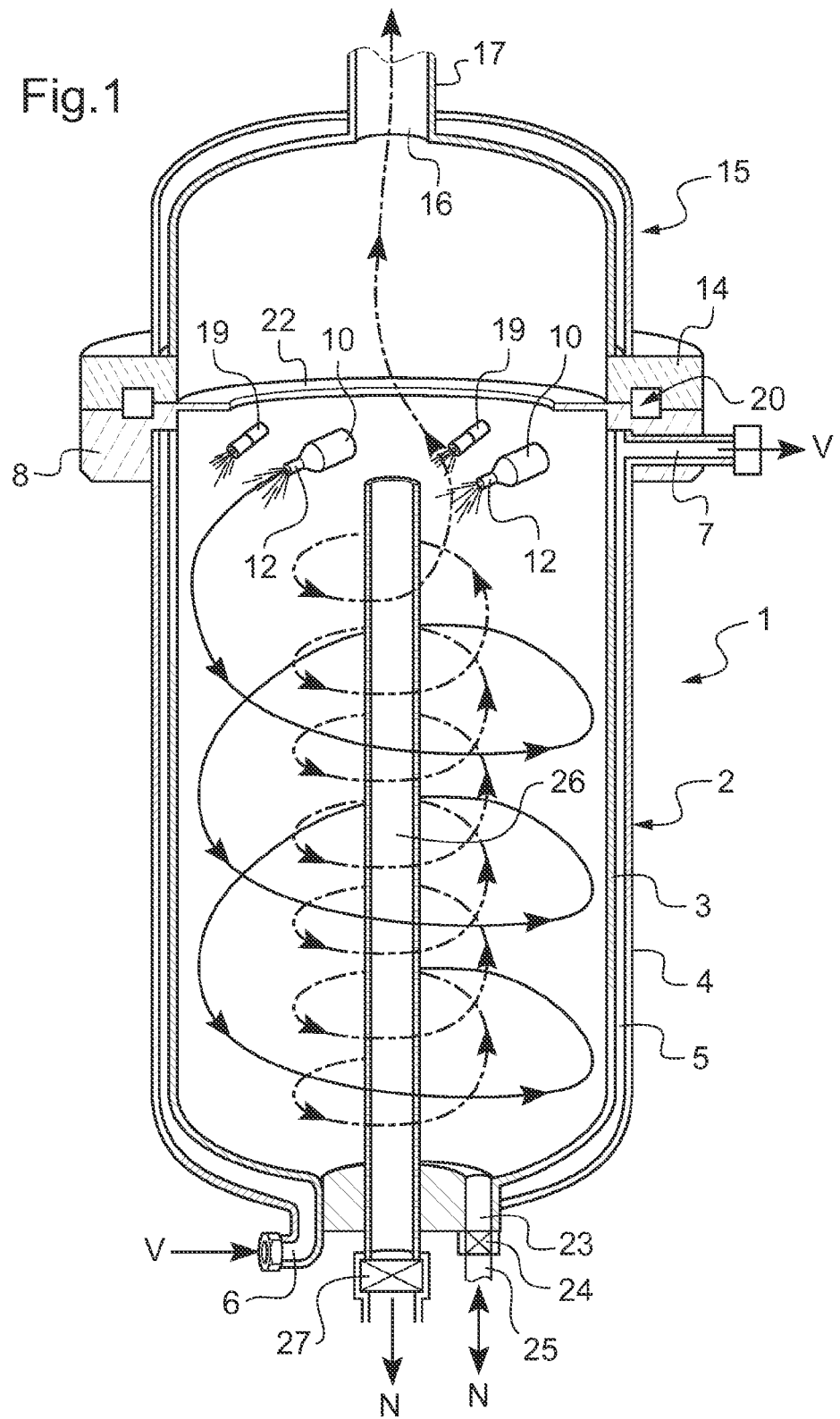
FIG. 1 is a perspective view of the device of the invention in section on a vertical axial plane of the enclosure.

With reference to the figures, the device of the invention comprises a cylindrical enclosure 1 of circular right section having a concave bottom, here of curvilinear shape. The side wall 2 is made in the form of a double wall having an inside wall 3 and an outside wall 4 defining between them a space 5.

The space 5 is closed at its top end by an annular ring 8 that also serves as a support for means for introducing treatment liquid of structure that is described in detail below.

A flow of steam is established in the space 5 by introducing steam V via a steam introduction coupling 6 at the base of the enclosure and the steam V is extracted therefrom via a steam outlet coupling 7 carried by the ring 8 in an angular position that is offset from the coupling 6, that is diametrically opposite in this example, so as to force the stream to flow around the inside wall 3 inside the space 5 between the inside wall 3 and the outside wall 4 by moving helically.

The ring 8 is associated with an annular ring 14 that is releasably fastened to the ring 8 in leaktight manner by fastener means that are not shown. The ring 14 supports the cover 15 of the enclosure that is formed by a double wall pierced in its top portion by an outlet orifice 16 having an outlet duct 17 mounted therein in leaktight manner and connected appropriately to devices for making use of the resulting treatment gas.

The device also includes liquid nozzles 9 carried by the ring 8. Each liquid nozzle 9 is formed by a hollow needle having one end 12 extending inside the enclosure and pierced by an outlet orifice, and another end 16 extending outside the enclosure and suitably connected by a coupling 17 to a feed circuit, as shown, serving to feed the liquid nozzles 9 with treatment liquid L, a solution of hydrogen peroxide in this example.

Each liquid nozzle 9 is associated with a blow pipe 10 extending coaxially around the corresponding nozzle 9. The outlet orifice 11 from each blow pipe 10 is adjacent to the outlet orifice 12 of the corresponding nozzle 9, being set back a little relative thereto. Outside the enclosure, the blow pipe 10 is connected by a coupling 18 to a source of air under pressure so as to inject air under pressure A into the blow pipe. The outlet orifice 11 of the blow pipe 10 is positioned relative to the outlet orifice 12 of the nozzle 9 so as to cause the liquid leaving the nozzle 9 to be pulverized into a spray and so as to entrain the liquid spray as a jet that is tangential to the inside wall 3 of the enclosure 1. The nozzles 9 and the associated blow pipes 10 are downwardly inclined at an angle that is sufficient to cause the jet comprising a mixture of air and droplets of pulverized liquid to move cyclonically downwards. In practice, the angle of inclination of the nozzles 9 and of the associated blow pipes 10 lies in the range 10° to 20°, and is preferably close to 10°.

In the preferred embodiment shown, an additional blow pipe 19 is associated with each liquid nozzle 9 and is placed relative to the liquid nozzle 9 so as to deflect the mixture of air and pulverized liquid produced by the liquid nozzle 9 and the associated blow pipes 10 in a downward direction. For this purpose, each additional blow pipe 19 is preferably located downstream from the corresponding liquid nozzle 9 relative to the jet of mixture and has an angle of inclination that is slightly steeper than that of the liquid nozzle 9, e.g. at an angle lying in the range 15° to 30°. The additional blow pipes 19 are fed by a circular duct 20 made by bringing into coincidence two grooves formed in the flanges 8 and 14. The circular duct 20 is suitably connected by a coupling 21 to an external source of air A.

An annular collar 22 made at the top portion of the flange 8 projects into the inside of the enclosure between the liquid nozzles 9 and the outlet orifice 16 and prevents liquid from rising up the wall 3.

When the device is in operation, the jets comprising a mixture of pulverized liquid propagate helically as represented by a chain-dotted line in FIG. 1 relative to a liquid nozzle 9 and the associated blow pipes 10 and 19. The jet of mixture initially propagates downwards, being in contact with the hot wall 3, and then rises in the central portion. The drops of liquid that might possibly remain in the gas stream rising towards the outlet orifice are subjected to centrifugal force that brings them into contact with the hot wall 3.

When the mixture reaches the outlet duct 17, the mixture thus comprises hydrogen peroxide in the form of a gas that is completely free of droplets, and this gas can thus be used in satisfactory manner for sterilizing containers that are to receive foodstuffs.

Figure 2:
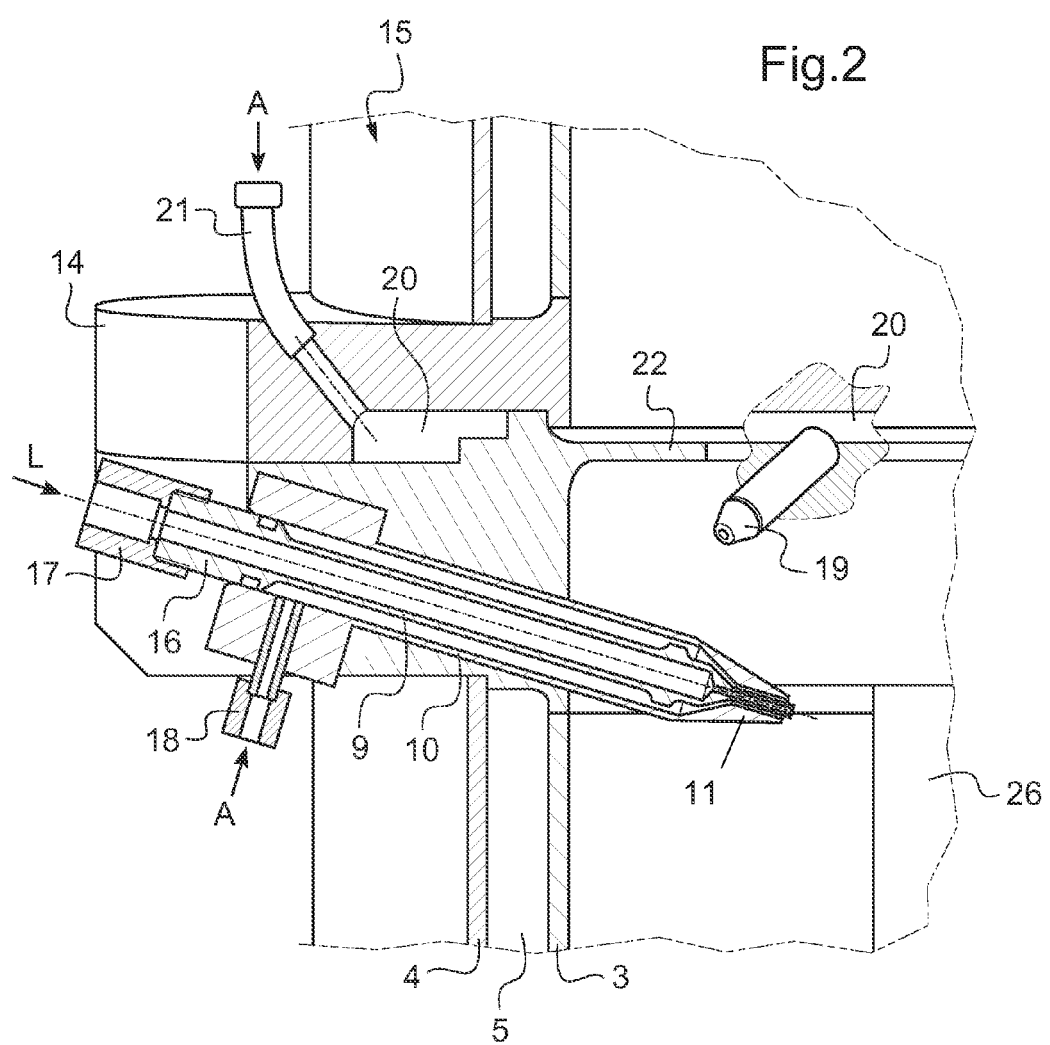
FIG. 2 is a fragmentary perspective view of a liquid nozzle and of an associated blow pipe in section on an axial vertical plane.

In another aspect of the invention, the device includes in its bottom portion an orifice 23 for introducing and removing an associated cleaning liquid via a valve 24 and a cleaning and emptying duct 25. In addition, an overflow tube 26 is located inside the enclosure and extends axially. The overflow tube 26 has a top end that is at least level and preferably slightly higher than the bottom ends 12 of the liquid nozzles 9, as can be seen in FIG. 2. At its bottom end, the overflow tube 26 passes through the bottom of the enclosure and is kept closed by a valve 27 while the device is in operation.

While the evaporator is in operation, solid residues become deposited on the wall 3 and in the bottom of the enclosure. During cleaning, the valves 23 and 27 are open and an acid cleaning liquid N is introduced via the orifice 23 until the liquid reaches the top end of the overflow tube 26. The cleaning liquid thus dissolves solid residues not only on the wall 3 and in the bottom of the enclosure, but also on the ends 12 of the nozzles 9.

Naturally, the invention is not limited to the embodiment shown and may be subjected to embodiment variants without going beyond the ambit of the invention as defined by the claims.

In particular, although the device of the invention is shown with additional blow pipes 19, thereby making it possible at will to vary the hydrogen peroxide content of the gaseous mixture leaving the evaporator, it is possible to provide a device that has only the liquid nozzles 9 and the associated blow pipes 10.

Although the invention is shown with a plurality of liquid nozzles 9, it is possible to provide a device having only one liquid nozzle 9 and only one associated blow pipe 10.

Although in the embodiment shown the liquid nozzles 9 are all located at the same level within the enclosure, provision may be made for placing the liquid nozzles at different levels in order to offset the jets of mixture. Under such circumstances, it is appropriate to provide a cleaning device different from that shown so as to avoid polluting the liquid nozzles and the associated blow pipes with the cleaning liquid.

Although the enclosure 1 is shown in the form of a cylinder of circular section with a smooth inside wall, the device of the invention may also be made with an enclosure having an inside wall of arbitrary shape and/or with an inside surface that presents a surface state that is not smooth, for example having fluting so as to give rise to turbulence within the stream generated by the blow pipes 10.

The enclosure may be heated by a coil surrounding the enclosure, on its outside.

Although the invention is described more particularly for extracting hydrogen peroxide, the device of the invention may also be used with other treatment liquids.

Although the invention is described as having nozzles that extend coaxially within blow pipes, the invention can be implemented with nozzles that extend perpendicularly to the wall and blow pipes that are placed perpendicularly to the ends of the nozzles.

What is claimed is:

1. A device for evaporating a treatment liquid, the device comprising a vertically placed cylindrical enclosure provided with:
   an outlet orifice opening out into the top end of the enclosure,
   a heated inside wall, and
   at least one liquid nozzle connected with a liquid treatment feed circuit and associated with a blow pipe connected to a source of air pressure so as to form a jet comprising a mixture of air and of pulverized treatment liquid, each liquid nozzle and the associated blow pipe extending in an upper portion of the enclosure and being arranged so that the jet of mixture is in a direction that is tangential to the inside wall of the enclosure and downwardly inclined so that the treatment liquid performs cyclonic movement in contact with the inside wall of the enclosure.

2. A device according to claim 1, wherein the cylindrical enclosure has a concave bottom.

3. A device according to claim 1, including a collar projecting into the inside of the enclosure between said at least one liquid nozzle and the outlet orifice.

4. A device according to claim 1, further including at as one additional blow pipe.

5. A device according to claim 4, wherein said at least one additional blow pipe is arranged relative to said at least one liquid nozzle so as to push the jet of mixture downwards.

6. A device according to claim 5, wherein said at least one additional blow pipe is disposed downstream from said at least one liquid nozzle relative to the jet of mixture, and said at least one additional blow pipe has an angle of inclination that is steeper than said at least one liquid nozzle.

7. A device according to claim 6, including a plurality of liquid nozzles each associated with an air blow pipe and with an additional blow pipe.

8. A device according to claim 1, including a cleaning duct opening out into the bottom of the vessel.

9. A device according to claim 8, including an overflow duct extending vertically from the bottom of the vessel.

10. A device according to claim 9, wherein the overflow duct has a top end extending at a level that is at least as high as a bottom end of said at least one liquid nozzle.

* * * * *